W. E. HARRIS.
DOOR OPERATING MECHANISM.
APPLICATION FILED APR. 22, 1914.
1,118,764.
Patented Nov. 24, 1914.
Fig. 1.
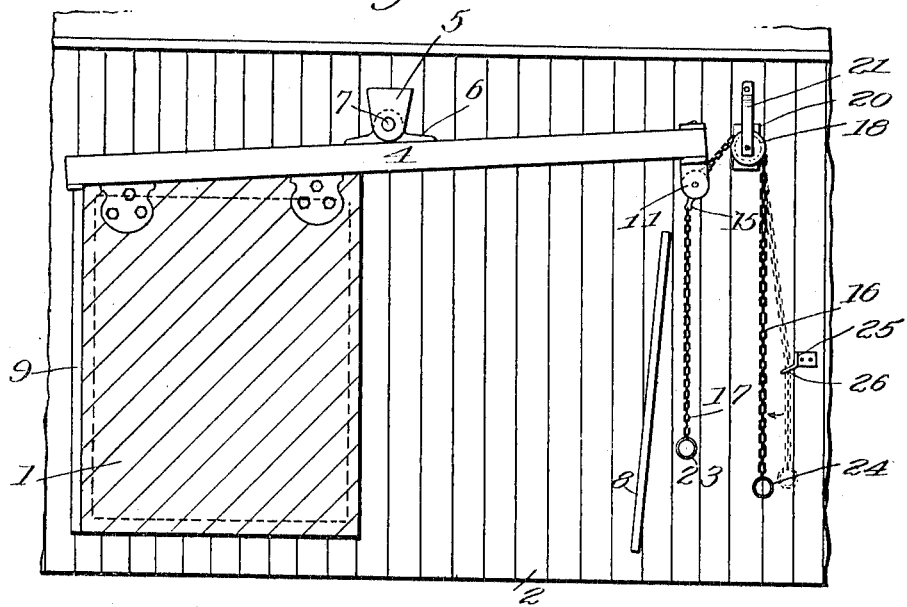
Fig. 2.
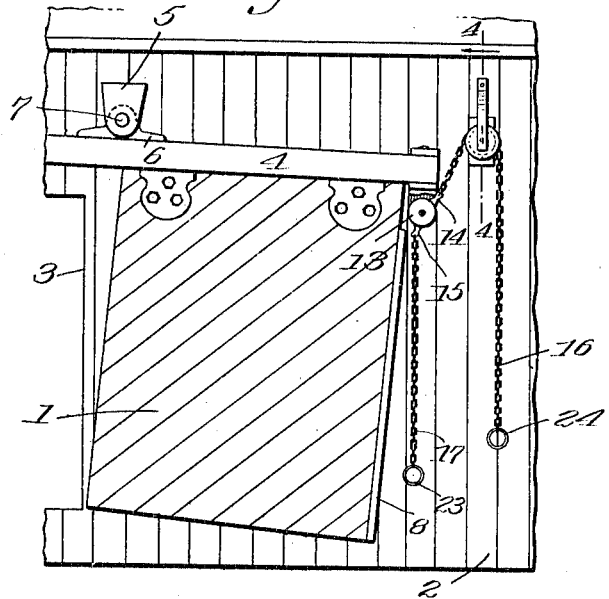
Fig. 3.
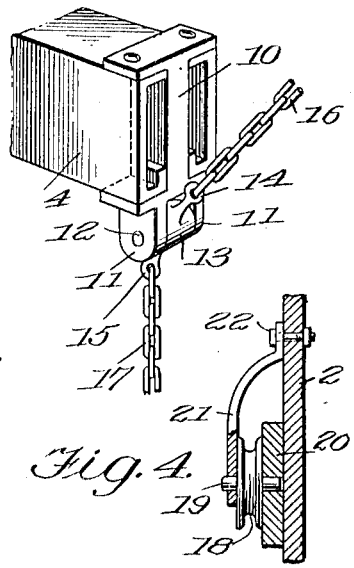
Fig. 4.
Fig. 5.
WITNESSES
A. E. Wade.
C. E. Trainor
INVENTOR
William E. Harris
BY Munn & Co.
ATTORNEYS

UNITED STATES PATENT OFFICE.

WILLIAM E. HARRIS, OF SCOTTSBORO, ALABAMA, ASSIGNOR OF ONE-HALF TO C. L. JARRETT, OF SPRINGFIELD, MISSOURI.

DOOR-OPERATING MECHANISM.

1,118,764.   Specification of Letters Patent.   Patented Nov. 24, 1914.

Application filed April 22, 1914. Serial No. 833,680.

*To all whom it may concern:*

Be it known that I, WILLIAM E. HARRIS, a citizen of the United States, and a resident of Scottsboro, in the county of Jackson and State of Alabama, have invented a new and useful Improvement in Door-Operating Mechanism, of which the following is a specification.

My invention is an improvement in door operating mechanism, especially adapted for freight car doors, or other doors of like character, arranged to slide over and away from over the door opening, wherein a track bar is provided pivoted intermediate its ends for swinging movement, the door being mounted to run on the track bar.

The present invention is an improvement over my prior Patent #1,087,764, granted February 17, 1914, and has for its more especial object to provide mechanism for operating the track bar.

In the drawings: Figure 1 is a partial side view of a car having a sliding door, and showing the parts with the door closed. Fig. 2 is a similar view showing the parts with the door open, Fig. 3 is an enlarged detail perspective view of the outer end of the track bar, Fig. 4 is a section on the line 4—4 of Fig. 2, with the chain removed, and Fig. 5 is a perspective view of the holder for the chain.

The present embodiment of the invention is shown in connection with the door 1 of a freight car 2, the said car having a door opening 3, and the door is provided with wheels, not shown, which engage within a tubular track bar 4 and run within the track bar on a track provided for this purpose, over and away from over the door opening.

The track bar 4 is pivotally connected with the substantially U-shaped hanger 5, secured to the car at one side of the door opening and above the same, and the track bar is provided intermediate its ends with a bearing 6, which is designed to register with openings in the arms of the bracket, and a pivot pin 7 is passed through the openings and the bearing to pivotally connect the track bar to the hanger. A stop 8 is secured to the side of the car in spaced relation with respect to the door opening and in inclined position for engagement by the door when it is opened to limit the movement of the door. The door is mounted to run freely on the track bar and is opened and closed by tilting the bar, as indicated in Figs. 1 and 2. When the outer end of the track bar is depressed, the door will run toward the said outer end until it engages the stop 8, while when the outer end of the track bar is lifted, the door will run over the opening, and a stop 9 is provided at the opposite side of the door opening from the stop 8 to hold the door in position over the opening.

The mechanism for swinging the track bar is arranged at the outer end of the track bar. A substantially I-shaped bracket 10, secured to the outer end of the track bar in the manner shown in Fig. 3, is provided with a pair of spaced parallel depending lugs 11 on its under side, and a pin 12 is journaled in the lugs. A roller 13 is journaled on the pin between the lugs, and the said roller is provided with oppositely extending radial arms 14 and 15, respectively. Each of the arms is provided with a perforation in its outer end, and chains 16 and 17 are connected with the arms. The chain 16 is connected with the arm 14, and the said chain extends upwardly from the arm over a pulley 18. The pulley is secured to a stub shaft 19, which is journaled in an opening in a block 20, secured to the side of the car 2 in any suitable manner, and in an opening in the lower end of a brace arm 21. The upper end of the brace arm is secured to the side of the car by means of a bolt and nut 22, and the pulley is free to rotate between the block and the arm. The free end of the chain 16 depends from the pulley as shown, and the said end is provided with a ring 23, for convenience in grasping the same. The chain 17 which is connected to the arm 15 of the roller depends directly downward, and the said chain is provided at its free end with a ring 24.

In operation, when the parts are in the position of Fig. 1, and it is desired to open the door, traction is made on the chain 17, by means of the ring 23 sufficient to swing the outer end of the track bar downwardly. The door will run on the track bar until it engages the stop 8. When it is desired to close the door, traction is made on the chain 16, by means of the ring 23, to swing the outer end of the track bar upward, as indicated in Fig. 1. It will be noticed that means is provided for temporarily holding the track bar in position to close the door during the closing of the door. The said means comprises a bracket 25, secured to the car below and a little to one side of the position occupied by the chain 17, when the outer end of the track bar is lifted. The bracket is provided with a pair of oppositely arranged parallel spaced spurs or lugs 26, for engaging a link of the chain to temporarily hold the track bar in the position mentioned. The object in arranging the bracket laterally is to permit the chain to disengage itself of its own weight from the spurs or lugs after the door has closed.

I claim:—

Means for swinging and locking an oscillating door track, comprising in combination with the track of a bracket connected to one end of the track and having a pair of laterally spaced lugs depending below the track, a roller pivoted between the lugs on an axis transverse to the track, said roller being provided with radial arms extending in opposite directions, a chain connected to each arm, a fixed pulley arranged adjacent to the end of the track provided with the bracket and at a higher level than the roller when the said end of the track is in highest position, the adjacent chain passing over the pulley, and a holding bracket arranged below the pulley and at the opposite side thereof from the track, said bracket having a pair of laterally spaced fingers extending toward the chain passing over the pulley and downwardly, and adapted to receive a link of the chain between the fingers to hold the track in adjusted position.

WILLIAM E. HARRIS.

Witnesses:
 C. O. Owens,
 Wm. T. Lassiter.

Copies of this patent may be obtained for five cents each, by addressing the "Commissioner of Patents, Washington, D. C."